(12) United States Patent
Liescheski

(10) Patent No.: US 7,532,992 B2
(45) Date of Patent: May 12, 2009

(54) MEASURING APPARATUSES AND METHODS OF USING THEM

(75) Inventor: Phillip B. Liescheski, Lincoln, NE (US)

(73) Assignee: Teledyne Isco, Inc., Lincoln, NE (US)

( * ) Notice: Subject to any disclaimer, the term of this patent is extended or adjusted under 35 U.S.C. 154(b) by 354 days.

(21) Appl. No.: 11/337,011

(22) Filed: Jan. 20, 2006

(65) Prior Publication Data

US 2007/0174013 A1    Jul. 26, 2007

(51) Int. Cl.
*G01F 1/12* (2006.01)
(52) U.S. Cl. .................................... 702/100
(58) Field of Classification Search ............... 702/100, 702/99; 703/8
See application file for complete search history.

(56) References Cited

U.S. PATENT DOCUMENTS

| | | | |
|---|---|---|---|
| 4,481,596 A * | 11/1984 | Townzen | 702/99 |
| 5,275,042 A | 1/1994 | Carson et al. | |
| 5,371,686 A | 12/1994 | Nabity et al. | |
| 5,731,995 A | 3/1998 | Benne et al. | |
| 5,777,892 A | 7/1998 | Nabity et al. | |
| 5,783,836 A | 7/1998 | Liu et al. | |
| 5,940,780 A | 8/1999 | Azar et al. | |
| 6,123,904 A | 9/2000 | Wright et al. | |
| 6,308,553 B1 | 10/2001 | Bonne et al. | |
| 6,311,136 B1 | 10/2001 | Henry et al. | |
| 6,314,380 B1 | 11/2001 | Seip et al. | |
| 6,352,001 B1 | 3/2002 | Wickert et al. | |
| 6,369,712 B2 | 4/2002 | Letkomiller et al. | |
| 6,401,045 B1 | 6/2002 | Rogers et al. | |
| 6,449,571 B1 | 9/2002 | Tarig et al. | |
| 6,470,286 B1 | 10/2002 | Seip et al. | |
| 6,505,519 B2 | 1/2003 | Henry et al. | |
| 6,681,625 B1 | 1/2004 | Berkcan et al. | |
| 6,681,787 B2 | 1/2004 | Tinsley et al. | |
| 6,691,061 B1 | 2/2004 | Rogers et al. | |
| 6,701,274 B1 | 3/2004 | Eryurek et al. | |

(Continued)

OTHER PUBLICATIONS

Eric W. Weisstein's "Least Squares Fitting—Polynomial"; Math World—http://mathworld.wolfram.com/leastsquaresfittingpolynomial.html, Sep. 22, 2008.

(Continued)

*Primary Examiner*—Tung S Lau
*Assistant Examiner*—Xiuquin Sun
(74) *Attorney, Agent, or Firm*—Vincent L. Carney

(57) ABSTRACT

A measuring instrument includes a transducer for measuring the depth of liquid and a transducer for measuring a physical parameter that causes interference error. A calibration polynomial is used to correct the output signal. The calibration polynomial includes the signal generated by the transducers as independent variables and the output signal as the dependent variable. The calibration polynomial is formed by a correction polynomial having at least one primary measurement signal and at least a first interference related signal as independent variables and a calibrated signal as a dependent variable. To form the calibration polynomial, a preliminary calibration polynomial including the primary independent variable and at least one interference related independent variable is developed. A plurality of data sets is generated from a test fixture. This data is used to eliminate the least significant terms of the preparatory calibration polynomial and to add the most significant cross terms.

8 Claims, 5 Drawing Sheets

U.S. PATENT DOCUMENTS

| | | |
|---|---|---|
| 6,715,339 B2 | 4/2004 | Bonne et al. |
| 6,754,594 B2 | 6/2004 | Henry et al. |
| 6,758,102 B2 | 7/2004 | Henry et al. |
| 6,769,307 B1 | 8/2004 | Dixon et al. |
| 6,775,632 B1 | 8/2004 | Pollack et al. |
| 6,777,940 B2 | 8/2004 | Macune |
| 6,782,332 B2 | 8/2004 | Seip et al. |
| 6,796,173 B1 | 9/2004 | Lajoie et al. |
| 6,850,857 B2 | 2/2005 | Ignagni et al. |
| 6,871,551 B2 | 3/2005 | Beller et al. |
| 6,877,387 B1 | 4/2005 | Certon et al. |
| 6,879,926 B2 | 4/2005 | Schmit et al. |
| 6,892,572 B2 | 5/2005 | Breed et al. |
| 2007/0288213 A1* | 12/2007 | Schantl et al. .......... 703/8 |

OTHER PUBLICATIONS

Data Reduction and Error Analysis for the Physical Sciences, Philip R. Bevington, 1969, Chapters 8 and 9, pp. 134-186.

* cited by examiner

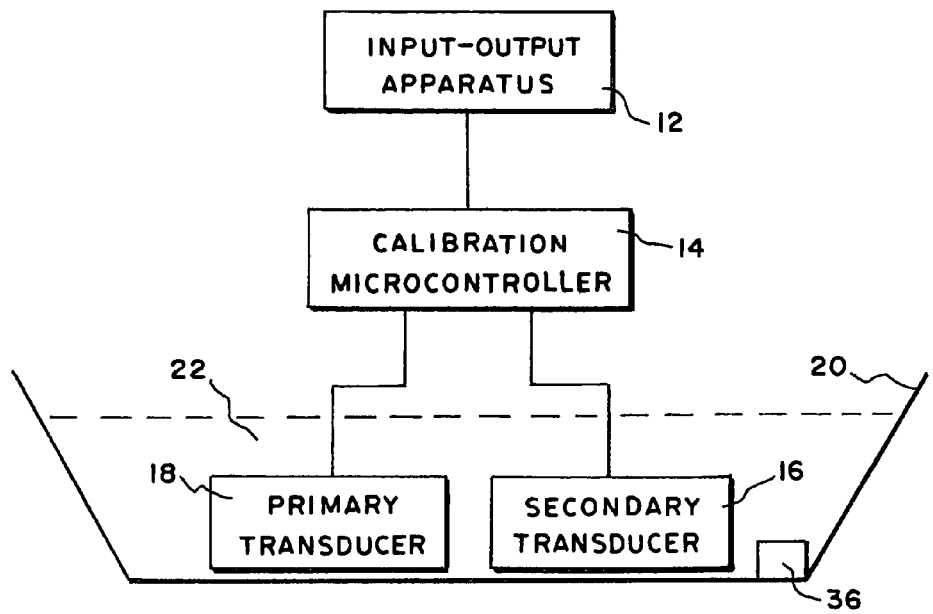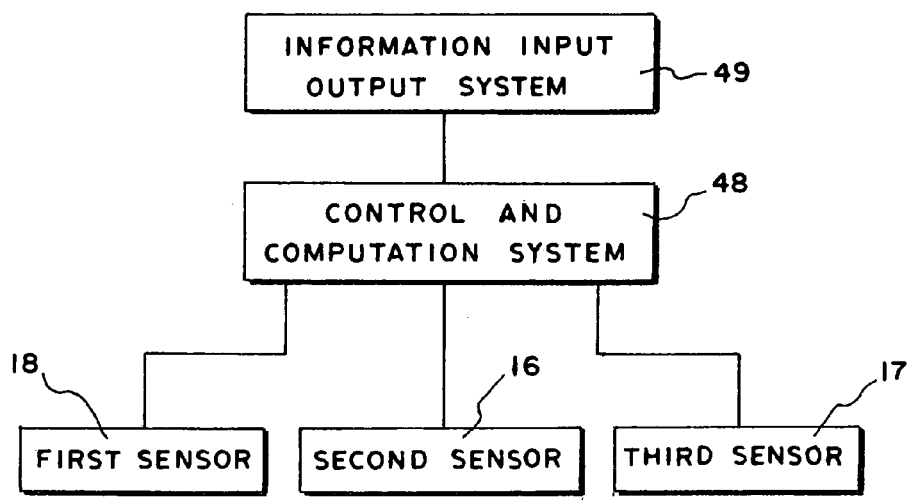

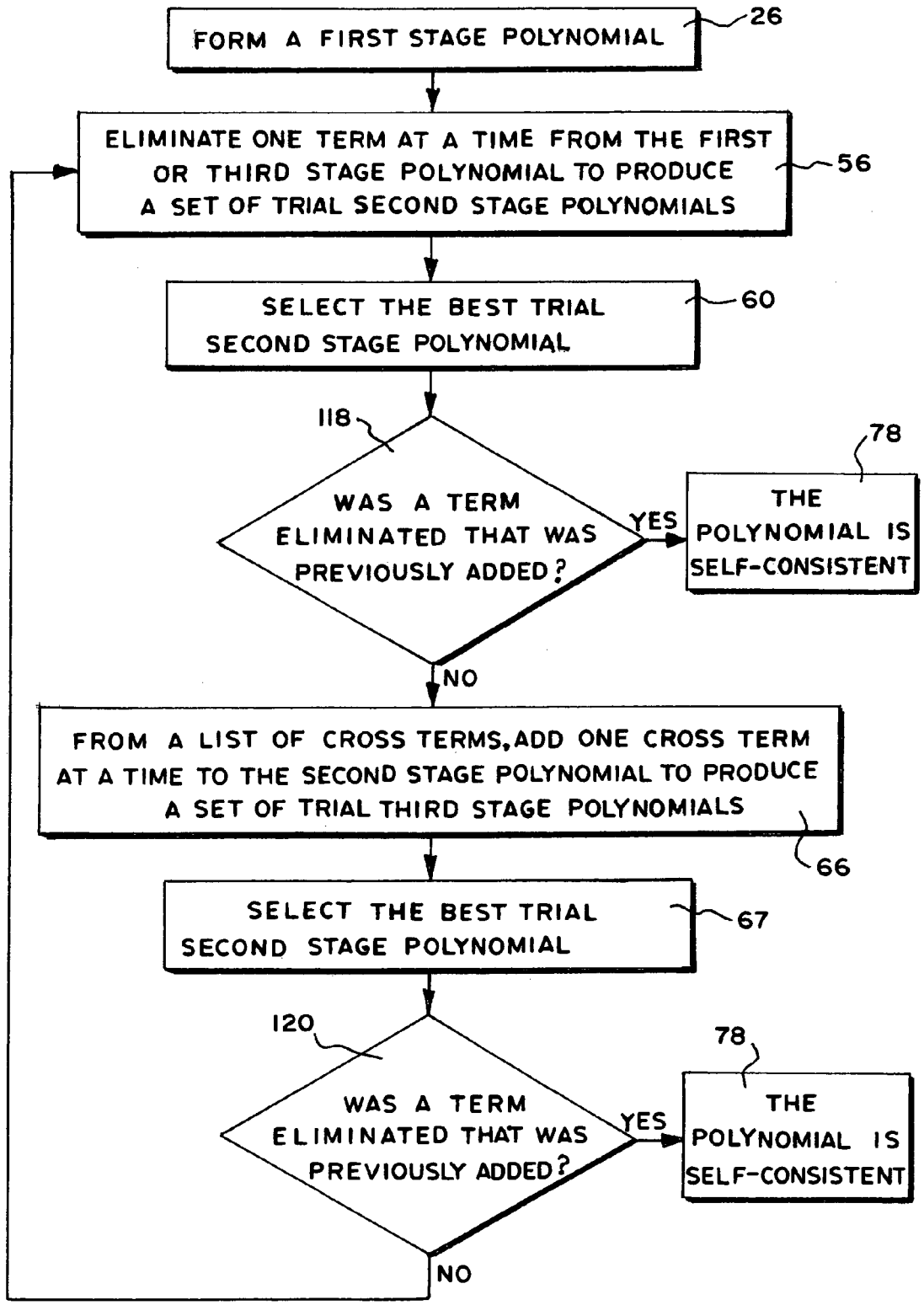

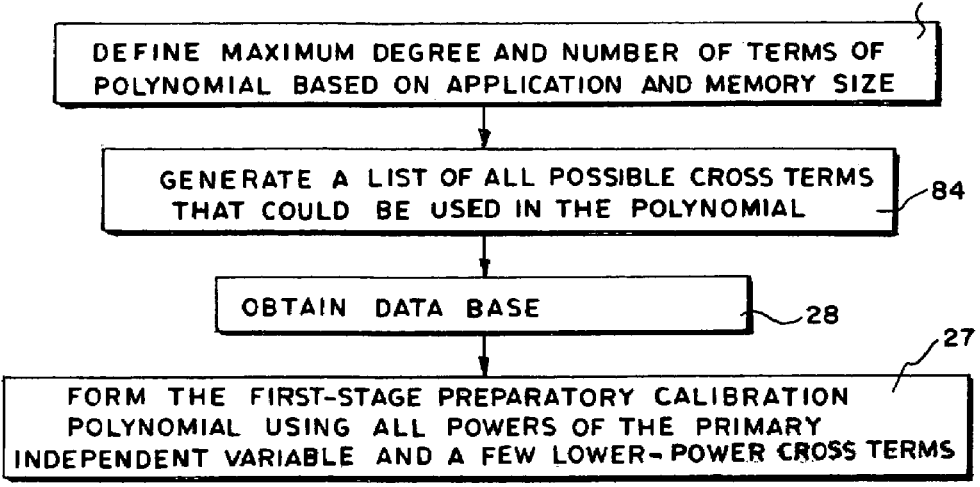
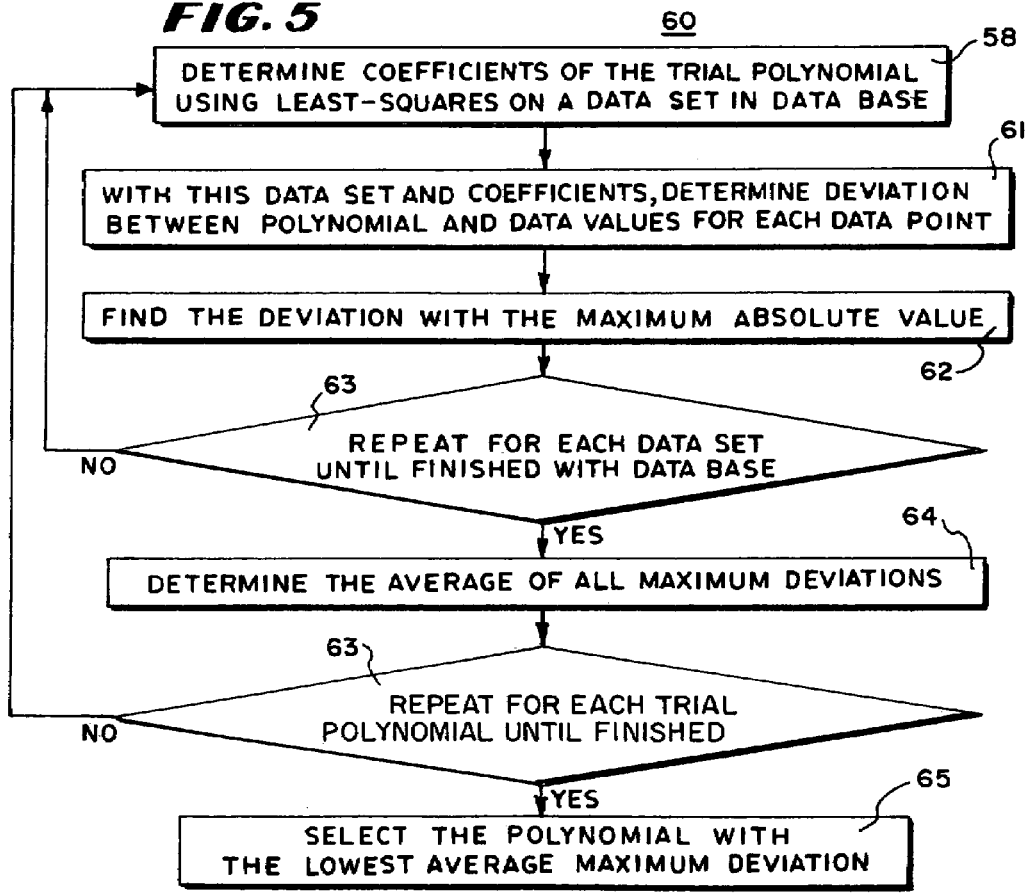

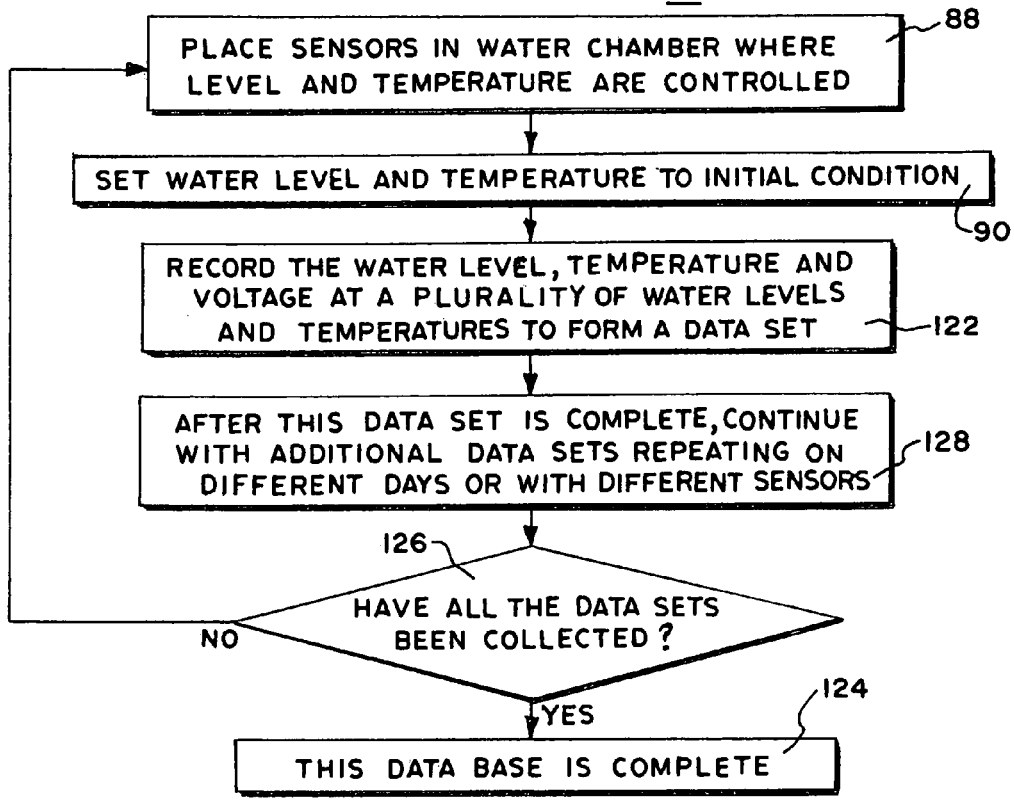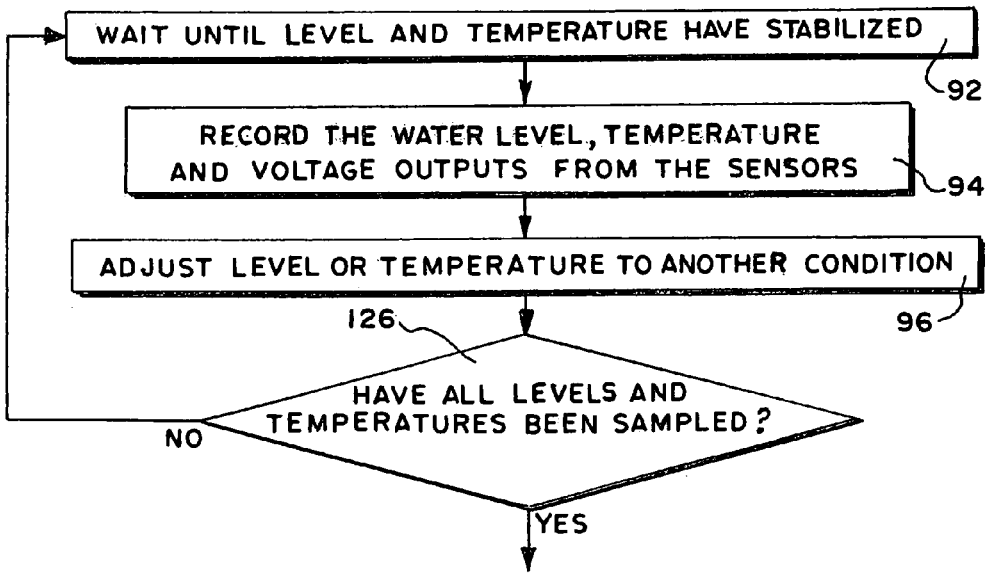

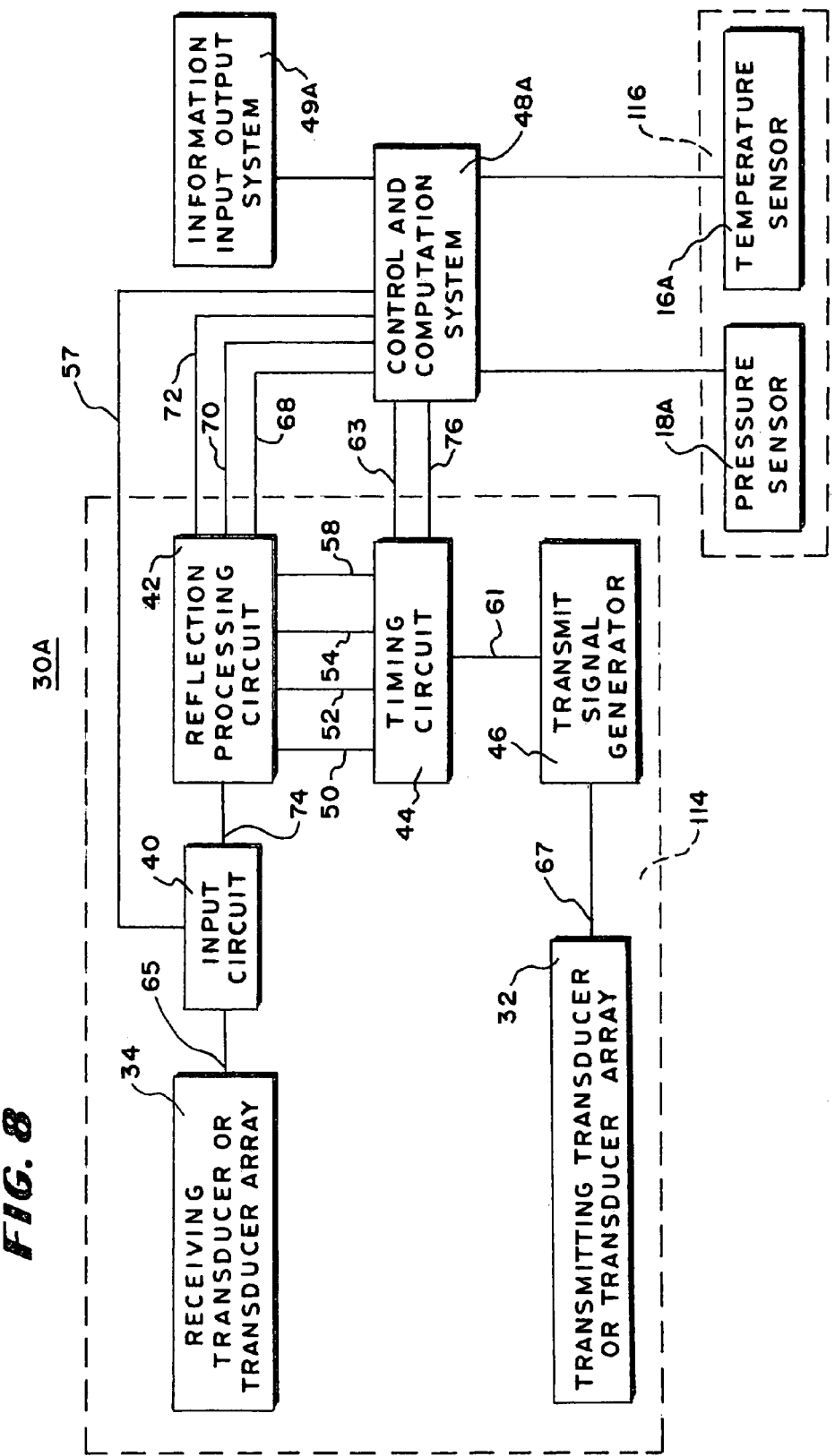

MEASURING APPARATUSES AND METHODS OF USING THEM

BACKGROUND OF THE INVENTION

This invention relates to measuring apparatuses and methods of using them such as for example apparatuses for measuring physical parameters, such as pressure, flow rates of liquids, chemical organic vapor concentrations and temperature.

Commonly, measuring instruments are affected by noise, nonlinearity and interference. Noise is related to random error—differences between the measured physical parameter value and the actual physical parameter value that cannot be corrected by additional information. Nonlinearity is a systematic error that arises from assuming a linear response of the instrument. Many transducers have an approximate mathematical linear relationship between its electrical signal voltage output and the measured physical parameter value. This linear relationship can greatly simplify the data processing of the instrument. There are trade offs between ease of data processing and precision in the design of such instruments. If accuracy and precision are more important than ease of data processing for a given application, then these nonlinear errors must be considered and treated. Additional information concerning these nonlinearities can be used to correct the measured physical parameter value. Interference is another systematic error that arises from the influences of other physical parameters on the measured signal. Information on these other physical parameters can be used to correct the original measured physical parameter value. This patent is mainly concerned with treatment of these last two error contributions: nonlinearity and interference.

For example, in one type of measuring apparatus, the depth of water is measured by sensing the pressure at the bottom of the water with a pressure sensor. The pressure sensors in these instruments are transducers that convert pressure to voltage. This pressure sensor has a voltage signal output which can be converted to a pressure signal value which can be further translated into a depth measurement by converting the pressure into units of depth. In some instruments, the depth measurement is used to determine the velocity of flow as in U.S. Pat. No. 5,275,042 or average velocity as in U.S. Pat. No. 5,371,686. Due to natural electrical "white noise" which is not predictable from additional information, the measured pressure parameter value has a noise contribution to the measurement error. These sensors are further assumed to have a linear mathematical relationship between the actual pressure and signal voltage output. Since this relationship is only approximate, the measured pressure parameter value has a nonlinear contribution to the measurement error. These sensors are also affected by temperature, another physical parameter. The measured pressure parameter value has an interference contribution to the measurement error.

In another type of sensor, chemical organic vapor concentrations are sensed by a tin oxide bead that varies its resistance to current as a function of organic vapor level changes due to competition between the organic vapor and oxygen in the air. The organic vapors reduce the tin oxide to metallic tin; whereas, the oxygen oxidizes the tin back to tin oxide. Tin and tin oxide have different electrical resistances. In this type of transducer, the measurement is affected by temperature and humidity. Temperature and water vapor in the air influence the resistance of the tin oxide bead. This effect is used in several other types of instruments such as for example in an analyzer of water for organic impurities as described in U.S. Pat. No. 6,123,904. The above two examples are provided for illustration since there are many different sensors in many different types of apparatuses that are affected by noise, nonlinearity and interference. The accuracy and precision of these sensors is reduced because the output signal voltage is also affected by other physical conditions such as temperature or humidity.

It is known to improve the precision of measurements by using higher-order, multivariant polynomial calibration curves to correct the measurements for nonlinearity and interference. It is also known to obtain the optimum coefficients of terms in the polynomial calibration curve by any of several methods including the least squares regression method. Commonly, the calibration curve is applied to measurements through a microcontroller.

In the prior art use of polynomial calibration curves, the general form of the polynomial such as the number of terms and the degree of the terms must be selected before the coefficients can be determined. Although the general form of the polynomial greatly influences the precision obtained from the use of the calibration polynomial, no completely satisfactory automatic approach for some calibration needs is known.

SUMMARY OF THE INVENTION

Accordingly, it is an object of the invention to provide a novel measuring system and method of using it.

It is a further object of the invention to provide a novel technique for calibrating measuring systems.

It is a still further object of the invention to provide a novel calibration system.

It is a still further object of the invention to provide a systematic technique for providing a calibration polynomial.

In accordance with the above and further objects of the invention, a measuring instrument for measuring at least a first value includes at least one sensor or transducer for generating a first signal representing the first value or parameter and at least one other sensor for generating a second signal representing a value or parameter that may interfere with the measurement of the first value, create error or otherwise cause the first value to be inaccurate or imprecise. There may be one or a plurality of such sensors that sense values to be measured and one or a plurality of sensors or transducers to measure values that may interfere, create error or otherwise cause the value or values being measured to be inaccurate or imprecise. The sensor or sensors for sensing the value or values being measured will hereinafter be referred to as the primary sensor or transducer or primary sensors or transducers and the value or values being measured will hereinafter be referred to as the primary value or values. The sensor or sensors measuring the value or values that may interfere, create error or otherwise cause the value being measured to be inaccurate hereinafter is referred to as a secondary sensor or sensors or a secondary transducer or transducers. A signal provided by the primary sensor or transducer is referred to in this specification as a primary measurement signal. The signal resulting from correction of a primary measurement signal in accordance with the methods described herein is referred to hereinafter as a calibrated signal.

In this specification, the word "value" and the word "parameter" each mean any physical characteristic that may be sensed such as for example the depth of water or pressure or temperature or intensity of energy. The word "value" herein includes not only values that are to be used or understood by a person but also values of interference that may interfere with values that are to be used. For example, the value to be measured may be pressure as measured by a pressure sensor and an interference related value may be temperature which alters the signal provided by the pressure sensor.

The measuring instrument may include a microcontroller for correcting the primary measurement signal to provide the calibrated signal. Hereinafter, the values that may interfere with this signal are referred to as interference related values and the signals generated by a secondary sensor or transducer from the interference related values are referred to as interference related signals. The microcontroller or other apparatus for correcting the signals includes a correction polynomial or correction curve hereinafter referred to as a criteria-optimized correction polynomial or curve or as a criteria-optimized calibration curve or polynomial. In this specification, the words "criteria-optimized correction polynomial" or "criteria-optimized correction curve" or "criteria-optimized calibration curve" or "criteria-optimized calibration polynomial" means a relationship formed using a special procedure described hereinafter The criteria-optimized correction polynomial or criteria-optimized correction curve includes the interference related signals and the uncorrected value of interest as independent variables and the corrected value to be measured as indicated by the calibrated signal as a dependent variable.

The microcontroller is connected to receive the primary measurement signal and one or more interference related signals. This enables the microcontroller to correct the primary measurement signal for the interference to provide the calibrated signal representing the corrected value of interest. In one embodiment, the measuring instrument is an apparatus for determining the volumetric rate of flow of a liquid within a flow bed. For this purpose, it includes apparatus for determining the average rate of flow of the liquid in the flow bed and the primary sensor is a pressure sensor positioned at the bottom of a flow path for the liquid. Thus the primary measurement signal is related to the depth of the liquid. An interference related sensor is a temperature measuring sensor in this embodiment.

In this embodiment, the criteria-optimized correction polynomial has the signals from the pressure sensor and temperature sensor as independent variables and depth as a dependent variable. The volumetric flow rate is calculated by the microcontroller by multiplying the depth by the average flow velocity of the water. In the preferred embodiment, the average flow velocity is determined by transmitting an ultrasonic signal into the liquid in the flow bed; receiving reflected ultrasonic signals; and utilizing the signals to calculate an approximate average velocity. The approximate average velocity is calculated by performing a Fourier transform on the digital signals and averaging certain of the coefficients of the Fourier transform as described in U.S. Pat. No. 5,371,686; the disclosure of which is incorporated herein by reference.

In one embodiment, the procedure for forming the criteria-optimized correction polynomial or criteria-optimized correction curve includes the steps of forming a preparatory calibration polynomial with a plurality of independent variables. One of the independent variables referred to hereinafter as a primary independent variable is the primary measurement signal. The other independent variables are the interference related signals. The dependent variable refers to the sought after measured value such as for example the primary signal corrected for interference and nonlinearity from a pressure sensor. This signal is referred to as the calibrated signal in this specification although the calibrated signal may be further modified such as by being converted to a digital signal from an analog signal or by being operated upon by other components of the circuit to make it suitable for other operations significant to the operation of the instrument. If this pressure sensor is used to indicate the depth of a liquid in which the pressure sensor is immersed, then the dependent variable is the depth of the liquid since the pressure multiplied by a constant reflecting the water density in the units being utilized provides a signal indicating the depth of the liquid.

The preparatory calibration polynomial includes as its terms the independent variables raised to a degree that is selected by criteria relating to the accuracy and precision desired or needed in the dependent variable for the application of the measuring instrument. The accuracy and precision may be selected because it is important to the usefulness of the instrument or the needs of the final procedure using the instrument. For example, a surgical instrument may require a certain procedure or not be usable for safety reasons. In this case, the safety of the patient is the criteria determining the precision of the instrument. On the other hand, the precision may be selected in view of the equipment that is to be used. The higher the degree of the independent variables and the number of cross terms, the larger the memory of the microcontroller or other apparatus or techniques used. Accordingly, if the size of the memory is limited then the degree of the independent variables will be limited even though that will have an adverse effect on the accuracy of the final measurement. In the preferred embodiment, the criteria can be the size of the memory or speed of a microcontroller.

Once the highest degree of the independent variables has been selected, a preparatory or working polynomial is formed including a plurality of terms. Each term has only one of the independent variables in it but the preparatory correction polynomial includes lower-degree variables. In the preferred embodiment, the preparatory correction polynomial prepared at this point of development includes terms having at least some of the lower degree variables. In the preferred embodiment, one or all of the independent variables of all degrees from the highest selected degree to the first degree are included. For example, if the fourth degree were to be selected for temperature then a variable, $C_4T^4$, would have a coefficient, $C_4$, and all of the lower degree of temperature such as $T^3$, $T^2$ and T have corresponding coefficients $C_3$, $C_2$ and $C_1$.

At this point in the development of the correction polynomial, no terms have multiple independent variables as part of them. Terms that include the product of two or more independent variables are hereinafter referred to as cross terms. In this specification, the degree of the variable refers to the power to which the variable is raised so that for example, the degree of $T^4$ is 4.

After the dependent variable, the independent variables and their degree have been chosen, some cross terms are added to the preparatory correction polynomial and the coefficients are evaluated using any known method such as the well known method referred to as the least squares regression method. The coefficients are determined using data obtained from a test arrangement that includes primary and secondary sensors. The cross terms that are added at this point preferably include only lower degree independent variables. Any arbitrary number of cross terms may be selected including none but it is desirable to select no more than half of the possible cross terms at this point. After the general form of the variables has been obtained including the dependent, independent variables and the cross terms with the selected degree of the variables, the coefficients are evaluated.

The coefficients are evaluated using data obtained from a test arrangement. An instrument designed to use the correction polynomial to obtain calibrated signals may serve as the test arrangement or a special test arrangement may be used. In either case, a primary and at least one secondary transducer are used to sense the primary value and the interference related value or values as the primary value is varied in a measurable manner to permit the calibrated signal to be determined. Each set of data comprising the primary value, interference related value and corrected value is obtained and collectively they are compiled into a data base used in testing the terms of the preparatory correction polynomials. For example, a pressure transducer may be the primary transducer and a thermistor may be a secondary transducer and the depth of the primary transducer may be the dependent variable. Data may be gathered by locating the transducers at a known depth in a body of water and the coefficients of a correction polynomial for depth may be found using any suitable method such as the least squares regression method. The preparatory correction polynomial at this point in its development is referred to in this specification as a first-stage preparatory correction polynomial.

After the first-stage preparatory correction polynomial has been formed, second-stage and third-stage preparatory correction polynomials are formed leading to a final step of arriving at the correction polynomial that is to be used to calculate the calibrated signal. The second-stage preparatory correction polynomials result from the elimination of terms that provide the least improvement to the precision of the measurement and the third-stage correction polynomials result from the addition of cross terms that provide the greatest improvement on the precision of the measurement.

In the preferred embodiment, the second and third-stage preparatory correction polynomials are alternately formed until second-stage and third-stage preparatory correction polynomials are substantially the same. At this point, a term that was eliminated from a second-stage preparatory correction polynomial is added to form a third-stage preparatory polynomial or a term that was added to form a third-stage preparatory correction polynomial is removed to form a second-stage correction polynomial. At this point in the development of the correction polynomial, the polynomial is said to be self-consistent. In the preferred embodiment, this self-consistent correction polynomial is used in the measuring instrument to form the calibrated signal from the values sensed by the instrument.

To form a second-stage preparatory correction polynomial, each term of the first-stage preparatory polynomial is tested and the term that improves the precision of the measurement the least using the data from the data base, a plurality of data sets is eliminated from the second-stage correction polynomial. A series of second-stage correction polynomials are formed by eliminating terms that improve the precision of the measurement the least. In the preferred embodiment, terms are eliminated until the selected criteria are met. For example, terms may be eliminated until the polynomial is usable in the size of the memory chosen for the microcontroller or until the third-stage preparatory correction polynomial formed by eliminating terms that improve the precision of the instrument the least and adding terms that improve the precision the most becomes self-consistent. In the preferred embodiment, the series of second-stage correction polynomials are not consecutive but alternates with the formation of third-stage correction polynomials.

To determine which term improves the precision of the measurement the least when forming a second-stage preparatory correction polynomial, a series of trial correction polynomials are formed. A trial polynomial is formed by eliminating a term from the first-stage correction polynomial, determining the coefficients with the term removed to obtain a trial correction polynomial and determining that the trial correction polynomial improved the precision of the measurement less than other trial correction polynomials being considered. These trial polynomials are compared to determine which trial polynomial provides the most precise and accurate determination of the dependent variable. That trial correction polynomial becomes a second-stage preparatory correction polynomial which may result in a final second-stage preparatory correction polynomial except for one or more possible third-stage correction polynomials formed by adding terms if the criteria is met or if the correction polynomial becomes self consistent.

In the preferred embodiment, each of the second-stage preparatory correction polynomials is selected from a comparison of every trial second-stage polynomial formed from elimination of every cross term from one other first or third-stage preparatory polynomial. However, it is possible to obtain good results by eliminating terms that include only one independent variable in addition to cross terms and to form and consider trial correction polynomials formed by eliminating terms to other second-stage correction polynomials and/or to form fewer trial correction polynomials for comparison by not forming trial polynomials by elimination of each cross term but only select some of the cross terms to be eliminated to form a trial polynomial.

In the preferred embodiment, second-stage trial correction polynomials are compared by calculating the dependent variable several times for each trial correction polynomial using a plurality of different data sets. Deviation between the calculated value and the actual value is determined for each trial polynomial at each of the plurality of data sets and a comparison made using these results. In the preferred embodiment, several measurements are made at each preset value for the dependent variable. For example, in the case in which pressure and temperature are the independent variables and the depth under water is the dependent variable, several measurements of pressures and temperatures are made with the test apparatus at known depths in generating the data base. Each trial correction polynomial is used to calculate depth from the values of pressure and temperature in the data base and the calculated values of depth are compared to the measured values from the data base at a plurality of data sets from the data base. A data set in this specification is a set of measurements at different depths, temperatures and pressures. Several sets are obtained for each correction polynomial and each trial correction polynomial is tested with several sets.

In the preferred embodiment, the maximum deviation from the plurality of data sets for each trial correction polynomial is taken as the standard to be used in determining which term will be discarded although any other value directly related to the disagreement error and reflecting the effect of the term on improving the precision or the measurement such as a value within ten percent of the maximum deviation could be used. The average of the maximum deviations for each trial correction polynomial is calculated and this is used to determine the trial correction polynomial that causes the lowest average maximum deviation. The second-stage trial correction polynomial that causes the lowest average maximum deviation is taken as a second-stage correction polynomial. Although the average maximum deviation is used as the comparison standard in the preferred embodiment, any other indicator of the central tendency of the deviations such as for example the mean deviation could be used for this selection provided it results in a correction polynomial that provides a more precise and accurate measurement.

To increase the precision of measurement, new cross terms are added to the second-stage preparatory correction polynomials one by one at a time to form trial third-stage preparatory correction polynomials. Each trial third-stage preparatory correction polynomial includes all of the terms of a second-stage preparatory polynomial with one added cross term. The trial third-stage correction polynomials are each evaluated and the cross term that improves the precision of the measurement the most are left in the final third-stage preparatory polynomial. Each time a cross term is added, the coefficients of all of the terms are optimized and the disagreement errors are found. When all of the disagreement errors have been found, a central tendency value such as the average maximum deviation is determined for the disagreement errors. The cross term that provides the lowest average deviation in a trial third-stage correction polynomial is added permanently. The polynomials obtained with the above procedure may be used to calibrate a measuring instrument. Thus, measuring instruments may be economically made and nevertheless provide high precision.

From the above summary it can be understood that the instrument of this invention and the method of using it has several advantages, such as for example: (1) it can be more easily calibrated; (2) some aspects of it are more easily automated; and (3) it can provide more precise operation.

SUMMARY OF THE DRAWINGS

The above noted and other features of the invention will be better understood from the following detailed description when considered in connection with the accompanying drawings, in which:

FIG. 1 is a block diagram of an apparatus for preparing a calibration curve in accordance with an embodiment of the invention;

FIG. 2 is a block diagram of a criteria-optimized instrument in accordance with an embodiment of the invention;

FIG. 3 is a flow diagram of a process for obtaining a criteria-optimized polynomial or curve;

FIG. 4 is a flow diagram of a subprocess for forming a first stage polynomial used in the process of FIG. 3;

FIG. 5 is a flow diagram of a subprocess for selecting the best trial second stage polynomial used in the process of FIG. 3.

FIG. 6 is a flow diagram of a process for performing another step of the process of FIG. 3 when applied to a pressure sensor used to determine the depth of the water in which it is immersed;

FIG. 7 is a more detailed flow diagram of a portion of the flow diagram of FIG. 6; and FIG. 8 is a block diagram of a volumetric velocity flow meter in accordance with an embodiment of the invention.

DETAILED DESCRIPTION

In FIG. 1, there is shown a block diagram of a system 10 for generating a calibration curve or polynomial having a primary transducer 18, a secondary transducer 16, a calibration microcontroller 14 and an input output apparatus 12. The calibration curve formed by the system 10 is an optimized correction polynomial sometimes referred to as an optimized calibration curve or polynomial formed by the process described herein. The calibration microcontroller 14 is electrically in circuit with the primary transducer 18, the secondary transducer 16 and the input output apparatus 12. The calibration microcontroller 14 obtains readings from the primary transducer 18 and the secondary transducer 16 and generates a calibration curve under the control of the input output apparatus 12. The calibration curve may then be transferred to other apparatus through the input output apparatus 12 or used to obtain a more precise output from the primary transducer 18 in a manner to be described in greater detail hereinafter.

The primary transducer 18 is intended to generate a signal representing a value of interest in some applications. The secondary transducer 16 is an interference related value. It is used to correct the reading from the primary transducer 18 to correct for interference related influences. The value that is sensed by the primary transducer 18 is the primary value. The electrical signal generated by the primary transducer 18 is referred to as the primary measurement signal and after it is corrected for nonlinearity and interference by the correction polynomial, it is referred to as the calibrated signal. Because changes in environment affect the primary measured signal, these changes are interference values. The primary values and interference values may be considered points of stimulation. The interference related signals from the secondary transducer 16 are referred to as secondary because they are not used directly for the purpose of obtaining measurement signals but are only used for removing error from the reading of the primary transducer 18, which is used for these purposes of obtaining measurement signals.

For example in the preferred embodiment, the system 10 generates a calibration curve for depth of a liquid to be used in a measuring instrument that measures depth and average velocity through a known flow bed and determines volumetric flow rate. In this instrument and in the system 10, the primary transducer 18 is a pressure sensor that responds to pressure by generating an electrical voltage. The primary transducer 18 is positioned at the bottom of the flow bed in the instrument and is positioned at different known depths of liquid 22 in a container 20 in the system 10. The secondary transducer 16 is a thermistor that generates voltage in response to temperature of the liquid 22. Temperature is interference in the instrument since it changes the voltage response to pressure of the primary transducer 18.

In the preferred embodiment, the system 10 generates a plurality of sets of data correlating depth of liquid, temperature and voltage output of the primary transducer 18. The depth measurement is a primary value that results in a primary measurement signal. Each set of data includes a plurality of readings of voltage output from the primary transducer 18, which are primary measurement signals and temperature of the liquid 22 which is an interference related value at different depths of the primary transducer 18. For example, the liquid 22 can be brought to a particular temperature by a temperature control device 36 and the depth of the primary transducer 18 in the liquid 22 can be changed by removing liquid from the container 20 or the liquid above the primary transducer 18 can be changed by changing the depth of the primary transducer 18. The voltage output from the primary transducer 18 can be read and recorded in the calibration microcontroller 14 at each depth of the primary transducer 18 and then the liquid 22 brought to a different temperature and the depth changed again to take readings to generate and record a set of depth, temperature voltage data at different temperatures and depths. This process can be repeated to generate and record several sets of data.

The data sets are obtained by obtaining a series of output values from one of a first of a primary transducer 18 and a secondary transducer 16 while the one of the first of a primary transducer 18 and secondary transducer 16 is at a first stimuli point and the other of the primary transducer and secondary transducer is subject to said series of other stimulating points. A series of output values, each at a different stimuli value of a series of stimuli values are obtained from the primary and secondary transducers. The primary independent variable is obtained from the primary transducer 18. In this specification, the words "stimulating point" mean a value of the independent variable. For example, in forming a data set in which water level is the dependant variable, the different levels at which the pressure sensor 18 is located are each stimulating points and the different temperatures for measurement are stimulating points.

The data sets are used to eliminate the least significant terms of the preparatory calibration polynomial by eliminating one term at a time of the preparatory polynomial. The coefficients of the remaining terms are determined and the maximum deviation determined until the maximum deviation has been determined for several of the terms. The terms that increase the maximum deviation the most are permanently eliminated. After the least significant terms have been eliminated from the calibration polynomial, cross terms are added one at a time, the coefficients for the polynomial each time a cross term is added are determined and the maximum deviation is determined. The cross terms having the most effect on the maximum deviation are permanently added.

The primary value is the value sensed by the primary transducer 18. In this example, the primary value is depth of the liquid. The electrical signal generated by the primary transducer 18 is referred to as the primary measurement signal and after it is corrected for nonlinearity and interference by the correction polynomial it is referred to as the calibrated signal. Because changes in temperature affect the pressure readings, temperature changes are interference values. The secondary transducer 16 measures the temperature and the signals from the thermistor 16 are interference related signals. Signals from the secondary transducer 16 are referred to as secondary because they are not used directly for the purpose of obtaining depth of the water nor average velocity of the water in the flow stream but for removing interference from the reading of the primary transducer 18, which is used for these purposes.

The calibration microcontroller 14 obtains readings of output voltage from the pressure sensor 18 at a plurality of data points which, in the preferred embodiment, are levels of water or other pressure inducing means. It also obtains readings of temperatures at which the readings of the level of water are obtained. It also receives or generates a general form of polynomial to serve as the framework of a model. While a calibration microcontroller is referred to in FIG. 1 and in the description of FIG. 1, these functions may be performed manually or by a microcontroller or microprocessor or used for other purposes as well as for calibration.

In the preferred embodiment, the polynomial consists of terms having temperature as an independent variable, terms having pressure as an independent variable and cross terms that are the product of temperature and pressure. The degree of the variables (powers or exponents) is selected in accordance with the precision needed and the microcontroller memory available. Coefficients of the starting polynomial are determined from the data sets using any appropriate technique. In the preferred embodiment, the well known least squares regression method is used as described in "Data Reduction and Error Analysis For The Physical Sciences", Chapters Eight and Nine, Pgs. 134-186. McGraw-Hill Book Company, New York, 1969. After these coefficients are found, the least significant cross terms are eliminated and the most significant cross terms that are within the design criteria are added in a manner described hereinafter. This polynomial is used to calibrate the measuring instrument.

In FIG. 2, there is shown a block diagram of a measuring instrument 30 having a control and computation system 48, a first sensor 18, a second sensor 16, a third sensor 17 and an information input/output system 49. The first sensor 18 is the primary transducer that senses the value to be measured, and in the preferred embodiment, transmits an electrical signal to the control and computation system 48. This signal may be subject to distortion due to the environment. There may be several different sources of interference such as temperature changes, electromagnetic fields or other types of radio frequency interference, environmental effects such as vibrations or moisture. The second and third sensors are interference transducers that measure the interference related sources separately. These interference signals from the second sensor 16 and the third sensor 17 are also transmitted to the control and computation system 48. In the preferred embodiment, the control and computation system 48 includes a microprocessor that contains a calibration curve or polynomial which is a criteria-optimized polynomial.

With this arrangement, the inputs to the control and computation system 48 result in a more precise signal that may be read out by the information input/output system 49. In the preferred embodiment, the criteria-optimized instrument 30 is a depth measuring system in which the first sensor 18 is a pressure sensor. This pressure sensor at the bottom of a flow stream is subject to pressure from the head of liquid in the flow stream and converts it to an electrical signal that is transmitted to the control and computation system 48. In the preferred embodiment, only one interference sensor is used. This sensor is the second sensor 16, which detects temperature. The temperature is used to correct for variations and the signal output from the first sensor 18 through the use of the criteria-optimized polynomial recorded in the microprocessor within the control and computation system 48.

In FIG. 3, there is shown a flow diagram 24 of a method for forming a criteria-optimized polynomial for use in calibrating a criteria-optimized instrument having as its principal steps the step 26 of forming a first-stage preparatory calibration polynomial, the step 56 of eliminating one term at a time from the first or third stage polynomial to produce a set of trial second stage polynomials, the step 60 of selecting the best second-stage preparatory calibration polynomial, the step 66 of forming third-stage preparatory calibration polynomials and the step 67 of selecting the best trial second stage polynomial as shown more completely in FIG. 4.

The step 66 of forming third stage preparatory calibration polynomials is performed only if a step 118 of determining whether a term was eliminated that had been previously added. If a term was eliminated that had been previously added, the polynomial is self-consistent as shown at step 78 and the formation of the calibration polynomial is complete. Similarly, the program 24 returns to the step 56 of eliminating one term at a time from the first or third stage polynomial to produce a set of trial second stage polynomials only if a step 120 of determining that a term was not eliminated that had been previously added. If a term was eliminated that had been previously added, the polynomial is self consistent as shown at step 78 and the calibration curve has been determined.

Since the first-stage polynomial formed in step 26 may have many terms, a set of many trial second-stage preparatory polynomials is formed in step 56—one for every term eliminated. For example, if the first-stage polynomial includes three terms, then the set of trial second-stage preparatory polynomials includes three polynomials. As a further example, if the first-stage polynomial were: $y=C_1X^2+C_2X^2+C_3XT$, then the complete set of trial second-stage preparatory polynomials would be: $y=C_2X^2+C_3XT$, $y=C_1X+C_3XT$ and $y=C_1X+C_2X^2$.

To select the most significant cross terms to be added to the preparatory second-stage polynomial, the process includes the step 66 of adding one new cross term from a list generated in step 84 (FIG. 4) to the second-stage polynomial to form a third-stage trial polynomial and the step 67 of selecting the best trial polynomial. The set of third-stage trial polynomials is formed by adding one cross term from the list from step 84 (FIG. 4) to the second-stage polynomial. As an example, if the list from step 84 (FIG. 4) contained three cross terms, then the set of third-stage trial polynomials would include three polynomials. As a further example, if the list of cross terms includes the cross terms: $X^2T$, $X^2T^2$ and $X^3T$ and if the second-stage polynomial is: $y=C_1X+C_2X^2$, the complete set of third-stage trial polynomials would contain: $y=C_1X+C_2X^2+C_3X^2T$, $y\ C_1X+C_2X^2+C_3\ X^2T^2$ and $y=C_1X+C_2X^2+C_3\ X^3T$. The process in step 66 in FIG. 3 of selecting the best third-stage trial polynomial is expanded in the process 60 as explained in greater detail later in FIG. 5. The process 60 in FIG. 5 can be applied to the selection of both second-stage and third-stage trial polynomials.

More specifically, the precision of measurements in a measuring instrument is increased while staying within a selected criteria by adding new cross terms to form third-stage preparatory correction polynomials. The cross terms that are added are selected from a set of all possible cross terms that can be formed from the independent variables in the first-stage preparatory correction polynomials except cross terms that were initially selected to be part of the first-stage preparatory correction polynomial. Terms that were selected to be part of the original first-stage preparatory correction polynomial remain in the second and third preparatory correction polynomials unless they are eliminated in forming a second-stage preparatory polynomial as described above.

Each of the cross terms that are considered for addition to the first-stage preparatory polynomial is added to a second-stage preparatory correction polynomial as shown in step 66 of FIG. 3 as one step leading to a third-stage trial correction polynomial. In the preferred embodiment, the cross terms are added one by one, and after the coefficients of the polynomial are optimized to form a third-stage trial correction polynomial, are then evaluated to select the cross terms that improve the precision of the measurement in a procedure analogous to the procedure used to eliminate terms from the second-stage preparatory correction polynomial as described above.

In the preferred embodiment, the cross terms that are added to form trial correction polynomials are: (1) cross terms not in the first-stage preparatory correction polynomial; and (2) cross terms that include an independent variable of lower or equal degree to the highest degree of the independent variable in the first-stage preparatory correction polynomial. For example, if the highest degree on one of the independent variables is $T^4$, cross terms are added to the extent necessary to provide a cross term that includes one or more of the independent variables $T^4$, $T^3$, $T^2$ and T but not $T^5$ in the preferred embodiment although it is possible under some circumstances to include an independent variable of a higher degree. The selection of lower degrees of the independent variables to form cross terms is done for each independent variable in the preferred embodiment. In the preferred embodiment, only one new cross term is included in the trial polynomial although more than one could be included.

Each time a cross term is added, the coefficients of all the terms are evaluated and the disagreement errors are found as described in connection with the development of second-stage preparatory correction polynomials. When all of the disagreement errors have been found, a central tendency value such as the average maximum deviation is determined for the disagreement errors. The cross term that provides the lowest average deviation in a trial third-stage correction polynomial is added permanently. Thus, cross terms having independent variables in them lower than the highest order independent variable in a term having only one independent variable and which improves the precision of the measurement are permanently added to the preparatory correction polynomial. Cross terms are added until the preparatory correction polynomials are self consistent or all of the cross terms with independent variables having degrees equal to or lower than the highest degree of an independent variable in the first-stage preparatory correction polynomial have been considered.

While the preferred embodiment only includes cross terms having independent variables with degrees lower than the independent variables in the first-stage preparatory correction polynomial, this is not absolutely necessary. If the design criteria is better met by adding cross terms with higher degree variables or terms with only one independent variable, these terms may be evaluated by the procedure herein, selected after evaluation and added if they meet the selected criteria. Thus, if the criteria are a limit on the amount of memory required by a correction polynomial and a larger capacity memory is provided, new terms for addition to the correction polynomial may be evaluated by this procedure.

In the preferred embodiment, the process 24 continues the steps 56, 60, 118, or 66, 67 and 120 until a term is eliminated that was previously added, indicating that the polynomial is self consistent. While the language optimized calibration curve is used in this specification, the calibration curve need not be perfectly or completely developed into the most effective form to be considered an optimized calibration polynomial to be within the scope of this invention. The steps 60 and 66 need not be carried out to any fixed point since they make incremental improvements at each step. Moreover, the elimination of the least significant terms need not be alternated with the step of adding significant terms nor need the same number of terms be eliminated as added and only one of the processes of eliminating terms of lower significance of adding terms of more significance may be used. However, in the preferred embodiment, the steps of eliminating a term of low significance and adding a term of high significance are alternated and the repetitive process is continued until a term is eliminated that was added during the step in which terms are added or a term is added that had been earlier eliminated. At this point, the calibration curve is said to be self consistent.

In FIG. 4, there is shown a flow diagram 26 of a process for forming the preparatory polynomial including the step 38 of choosing the maximum degree of independent variables suitable for the criteria and choosing the number of terms of the polynomial in accordance with the criteria, the step 84 of generating a list of all possible cross terms, the step 28 of obtaining a data base (see FIG. 6) and the step 27 of combining all powers of the primary independent variable up to the degree of the polynomial and a few of the lower-power cross terms into the first-stage preparatory polynomial. The first-stage preparatory polynomial could also contain no cross terms, especially if the user is unsure about the ranking of their significance, since this process would automatically include them according to their significance.

The selection of the maximum degree of the independent variables and the number of terms of the polynomial generally involves a compromise between the complexity of the equipment, the size of the memory to be used and the precision of the measurements to be obtained. The precision of measurement increases with an increase in the number of terms, the degree of the variables and the number of cross terms. On the other hand, in embodiments implemented by a microcontroller, an increase in the number of terms, the degree of the variables, and the number of cross terms require an increase in the complexity and the size of memory. In the preferred embodiment, a microcontroller is used although the processes described herein in this specification can be performed by hand without the use of a microcontroller.

Once the highest degree of the independent variables has been selected, a first-stage preparatory or working polynomial is formed including a plurality of terms. Some of these terms include powers of independent variables and others are cross terms including a product of two or more independent variables as shown at step 84. Terms that include the product of two or more independent variables are herein referred to as cross terms. The coefficients for the terms are selected using any known curve fitting method such as the well known least squares regression method. In the preferred embodiment, one or all of the independent variables of all degrees from the highest selected degree to the first degree are included. For example, if the fourth degree were to be selected for temperature, then a variable, $C_4T^4$ would have a coefficient, $C_4$ and all of the lower powers of temperature such as $T^3$, $T^2$ and $T^1$ have corresponding coefficients $C_3$, $C_2$ and $C_1$.

In FIG. 5, there is shown a flow diagram of a process 60 of selecting the best trial polynomial comprising the step 58 of determining optimum coefficients of the terms of the trial polynomial by fitting the polynomial to one data set within the data base, the step 61 of determining the deviation or disagreement error between the dependent value of polynomial obtained in step 58 and the corresponding dependent data value for each stimulating point in the data set and the step 62 of finding the deviation with the maximum absolute value for that particular data set. The steps 58, 61 and 62 are repeated for every data set within the data base as shown at step 63.

After completing the analysis of the data base, the average value of all of the maximum deviations for all data sets within the data base is determined in step 64. The value of the average maximum deviation is related to the rank of significance for that particular trial polynomial. The steps 58, 61, 62 and 64 are repeated as shown at step 63 for the next trial polynomial in order to determine its rank of significance. This process is continued until all trial polynomials have been ranked in significance. After all of the trial polynomials have been ranked, the trial polynomial with the lowest value for the average maximum deviation is selected as the best polynomial as shown at step 65. This trial polynomial has the least deviation or disagreement error with the data base. The process 60 applies the same to both second-stage and third-stage trial preparatory calibration polynomials.

To determine which term improves the precision of the measurement the least when forming a second-stage preparatory correction polynomial, a series of trial correction polynomials are formed. A trial polynomial is formed by eliminating a term from the first-stage correction polynomial, determining the optimum coefficients with the term removed to obtain a second-stage trial correction polynomial and eliminating second-stage trial correction polynomials that improved the precision of the measurement less than other second-stage trial correction polynomials being considered. These trial polynomials are compared to determine which trial polynomial provides the most precise determination of the dependent variable. The second-stage trial correction polynomial that provides the most precise measurement becomes a second-stage preparatory correction polynomial, which may result in a final second-stage preparatory correction polynomial except for one or more possible third-stage correction polynomials formed by adding terms if the criteria is met or the correction polynomial becomes self consistent.

In the preferred embodiment, each of the second-stage preparatory correction polynomials is selected from a comparison of every trial second-stage polynomial formed from elimination of every cross term from one other first or third-stage preparatory polynomial. However, it is possible to obtain good results by eliminating terms that include only one independent variable in addition to cross terms and to form and consider trial correction polynomials formed by eliminating terms from other second-stage correction polynomials and/or to form fewer trial correction polynomials for comparison by not forming trial polynomials by elimination of each cross term but only select some of the cross terms to be eliminated to form a trial polynomial.

In the preferred embodiment, second-stage trial correction polynomials are compared by calculating the dependent variable several times for each trial correction polynomial using a plurality of different data sets. Deviation between the calculated value and the actual value is determined for each trial polynomial at each of the plurality of data sets and a comparison made using these results. In the preferred embodiment, several measurements are made at each preset value for the dependent variable. For example, in the case in which pressure and temperature are the independent variables and the depth under water is the dependent variable, several measurements of pressures and temperatures are made with the test apparatus at known depths in generating the data base. Each trial correction polynomial is used to calculate depth from the values of pressure and temperature in the data base and the calculated values of depth compared to the measured values from the data base at a plurality of data sets from the data base. A data set in this specification is a set of measurements at different depths, temperatures and pressures. Several sets are obtained for each correction polynomial and each trial correction polynomial is tested with several sets.

In the preferred embodiment, the maximum deviation from the plurality of data sets for each trial correction polynomial is taken as the standard to be used in determining which term will be discarded although any other value directly related to the disagreement error and reflecting the effect of the term on improving the precision or the measurement such as a value within ten percent of the maximum deviation could be used. The average of the maximum deviations for each trial correction polynomial is calculated and this is used to determine the trial correction polynomial that causes the lowest average maximum deviation. The second-stage trial correction polynomial that causes the lowest average maximum deviation is taken as a second-stage correction polynomial. Although the average maximum deviation is used as the comparison standard in the preferred embodiment, any other indicator of the central tendency of the deviations such as for example the mean deviation could be used for this selection provided it results in a correction polynomial that provides a more precise measurement.

In FIG. 6, there is shown a flow diagram of the process 28 for obtaining a plurality of data sets including the step 88 of placing the pressure transducer or sensor and thermistor in a water bath in which its temperature and water level are controlled, the step 90 of setting the temperature of the water bath and the water level to some chosen initial condition and the step 122 of recording the water level, temperature and voltage at a plurality of water levels and temperatures to form a data set, and the step 128 of continuing with additional data sets by repeating on different days or with different sensors after the data set is complete. After each data set is complete, the decision step 126 returns to step 88 unless all data sets have been collected. If all data sets have been collected, the data base is complete as shown at step 124.

In FIG. 7, there is shown a flow diagram of the step 122 of recording the water level, temperature and voltage at a plurality of water levels and temperatures to form a data set (FIG. 6) having the substep 92 of waiting until level and temperature have stabilized, the substep 94 of recording the water level or depth of transducer, temperature and voltage signal outputs from all transducers and the substep 96 of readjusting the water level or temperature or both for a new condition and repeating as shown at step 126 the prior steps 92, 94 and 96 if all levels and temperatures have been sampled. These steps are repeated until data relating temperature to pressure signals at a plurality of depths and temperatures have been obtained. These steps are more fully described in connection with the description of FIG. 1 above. Of course, the transducer could first be kept at a single location in the water bath and the temperature varied to obtain data for a plurality of temperatures for the one location in the water and then the transducer moved to a different depth and the temperature changed again with these steps being repeated until sufficient data has been obtained but this would be a more time consuming process.

Steps 92, 94 and 96 in repetition generate only one data set. The data base is considered a collection or plurality of data sets. In other words, a data set is a subset of the data base. The data set only includes calibration data for particular transducers and a particular day. The data base includes calibration data for all transducers and all days. Calibration data collected on a particular transducer on the first day would constitute a complete data set. Calibration data collected on the same transducer on another day would constitute a separate but complete data set. Calibration data collected on another transducer would constitute yet another separate but complete data set. All three data sets would be contained in the data base. Elsewhere, the data base is also referred to as the plurality of data sets.

With the above procedure, an instrument is calibrated by forming a calibration polynomial to provide a calibrated signal indicating a measured value corrected for interference and nonlinearity. To prepare the calibration polynomial, a first-stage preparatory correction polynomial including the primary independent variable, at least one interference related independent variable and some or no cross terms is first prepared. A plurality of data sets, that is a data base, of the dependent variable, the primary independent variable and the at least one interference related independent variable is obtained. The data sets are used to eliminate the least significant terms of the first-stage preparatory correction polynomial and to add the most significant cross terms as described above.

In making an instrument, a design criteria is selected such as the precision needed or the size of memory that can be used to calibrate the instrument and a criteria-optimized calibration curve is prepared that will satisfy this criteria. The primary transducers 18 and at least one secondary transducer 16 are selected to sense the values being measured and the interference related signals or factors that might reduce the precision of the measuring instrument. The microcontroller 14 is programmed to correct the value measured by the primary transducer 18. The instrument may use this corrected value to make further calculations and/or may provide a display of the corrected value.

In FIG. 8, there is shown a block diagram of a volumetric flow meter 30A having an average velocity sensing system 114, a depth sensing system 116, a control and computation system 48A and an information input output system 49A. The control and computation system 48A communicates with the average velocity sensing system 114, the depth sensing system 116 and the information input output system 49A. The control and computation system 48A: (1) receives input information such as data and commands from the input output system 49A; (2) provides information to the information input output system 49A; (3) receives data and information from the depth sensing system 116; and (4) receives average time of transit information from the average velocity sensing system 114. It can calculate the criteria-optimized polymer from the data received from the depth sensing system 116 or receive this information through the information input output system 49A and can calculate volumetric flow rate from the depth information and the average velocity.

The average velocity sensing system 114 includes an ultrasonic Doppler transmitter and receiver under the control of an automatic range and threshold setting system. The velocity meter transmits sound through a representative section of a flow stream or through the entire cross section of the flow stream and receives a complex signal back which is digitized and analyzed using a fast Fourier transform analyzer. With this arrangement, receive and transmit transducers 34 and 32 are positioned at an angle to the horizontal to radiate a beam to and receive reflections from a representative portion of the flow stream.

The resolution of the measurement depends on the number of ranges of frequencies selected for each term of the Fourier transform analyzer across the full range of frequency shifts caused by the range of possible velocities in the flow stream. The expected velocity range is determined in the preferred embodiment and 256 bands of frequencies are selected for positive and negative terms of the Fourier transform analyzer.

The words, "representative portion", in this specification means a portion of the total flow stream which has a volume that includes within it smaller portions of fluid streams at each velocity flowing in the total flow stream with the fluid streams for each of the velocities of the smaller portions of flow streams having a reflective portion that is in the same proportion to the size of the reflective portion of the total flow stream having the same velocity as any other reflective smaller portion with a different velocity in the representative portion. That proportionality can be achieved in part by reflecting signals from a volume of the liquid rather than from an imaginary plane cutting the flow stream.

In this definition of a representative portion, each unit area flowing at a particular velocity in the representative portion has a ratio to the area of liquid of the total flow stream flowing at that rate which is the same ratio as every other cross sectional area flowing at that flow rate. Thus, this representative portion truly reflects the average flow rate of the entire flow stream.

In practice, some inaccuracy always occurs because of the failure to properly sample either the entire cross sectional area of the flow stream or a portion that is precisely a representative portion. Because it is easier to utilize a representative portion than the total cross sectional area, the preferred embodiment utilizes a representative portion and preferably arrives at this representative portion by selecting an angle at which the ultrasonic sound is reflected and selecting an angle at which it is received so that proportional amounts of the fluid flowing at each velocity reflect signals to the receiving transducer or transducers 34. One such error is caused by a lack of symmetry in the reflected signal with respect to an axis perpendicular to the transducer when the reflected signal is considered as a cone. It can be easily corrected, however. The lack of symmetry can be corrected by using a fixed factor such as two percent or other value to account for the discrepancy.

The average velocity sensing system 114 further includes an input circuit 40, a reflection processing circuit 42, a time-control and computation system 48A, the information input output system 49A, a timing circuit 44 and a transmitting signal generator 46. The input circuit 40 is electrically connected to the receiving transducer or transducer array 34 through a conductor 65 to receive signals therefrom, amplify them with automatic gain control and transmit the signals to the reflection processing circuit 42 through a conductor 74.

The reflection processing circuit 42 is electrically connected to: (1) the timing circuit 44 through conductors 50, 52, 54 and 58 which control the scanning of amplitudes and setting of a threshold value; and (2) the time control and computation system 48A through conductors 70 and 72 through which it transmits data for use by the time control and computation system 48A and through the conductor 68 from the time control and computation system 48A from which it which receives signals which control the time of transmission of data to the time control and computation system 48A.

The time control and computation system 48A is electrically connected to the timing circuit 44 through conductors 63 and 76 to control the synchronization of the entire flow meter 30A and to establish sampling rates and frequency cutoff points to the input circuit 40 to adjust the amplitude level of an automatic gain control circuit to obtain an adequate signal. The timing circuit 44 is electrically connected to the transmit signal generator 46 through conductor 61 through which it transmits signals to control the time at which the transmit signal generator 46 transmits signals to the transmitting transducer or transducer array 32 through a conductor 67. These signals control the sampling time and the repetition rate of the transmitted ultrasonic signals for the purpose of scanning across a range of sample times and rates for increased precision.

A pressure sensor 18A is electrically connected to the time control and computation system 48A to transmit depth information thereto and the information input output system 49A, which includes a computer keyboard and other input devices, supplies information to the time control and computation system 48A, such as a cross-sectional area of the flow stream. With these values, the time control and computation system 48A is able to calculate the area of flow in the flow stream and the average velocity, and from that, calculate the rate of flow of liquid in the flow stream in a manner known in the art.

In general, an attempt is made to receive Doppler shift information from the entire cross-section of the stream. The signals are intended to represent all of the actual velocities and the cross-sectional area of each of the velocities. These velocities and cross-sectional areas may be represented in a curve, with the velocities being represented along the abscissa and the amount of area of the cross-section having each velocity or small range of velocities as the ordinates when viewed graphically. These values are measured with the Doppler frequency shift representing the velocity and the amplitude of the received ultrasonic signal as the area having that velocity. The average velocity system is explained in greater detail in the aforementioned U.S. Pat. No. 5,777,892, the disclosure of which is incorporated herein by reference.

While a somewhat detailed explanation of criteria optimized polymers has been provided, the words "criteria-optimized polynomial" is not intended to be limited to all of the features of this explanation. The words "criteria-optimized polynomial" refers to any procedure which includes the steps of forming a preparatory calibration polynomial including the primary independent variable and at least one interference related independent variable, obtaining a plurality of data sets of the dependent variable, the primary independent variable and at least one interference related independent variable and using the data sets to eliminate the least significant terms of the preparatory calibration polynomial or to add the most significant cross terms to the preparatory calibration polynomial until a criteria arbitrarily selected for a general purpose has been met or to add terms that provide a correction polynomial that improves the precision of the measurement.

In this specification, the words "criteria-optimized" when applied to an instrument means an instrument using a criteria-optimized polynomial to improve its precision and when applied to a calibration curve or polynomial means that the calibration curve or polynomial has been formed by first forming a preparatory or preparatory calibration polynomial including the primary independent variable and at least one interference related independent variable, obtaining a plurality of data sets of the dependent variable, the primary independent variable and the at least one interference related independent variable either before or after forming the polynomial and then using the data sets to eliminate the least significant terms of the preparatory calibration polynomial or to add the more significant terms.

From the above description, it can be understood that the instrument of this invention and the method of using it has several advantages, such as for example: (1) it can be more easily calibrated; (2) some aspects of it are more easily automated; and (3) it can provide more precise operation.

While a preferred embodiment of the invention has been described with some particularity, many modifications and variations in the system are possible without deviating from the invention. Therefore, it is to be understood that, within the scope of the appended claims, the invention may be practiced other than as specifically described.

What is claimed is:

1. A method of calibrating an instrument, comprising the steps of:
   forming a preparatory calibration polynomial including a primary independent variable and at least one interference related independent variable;
   obtaining a plurality of data sets of a dependent variable, the primary independent variable and the at least one interference related independent variable;
   using the data sets to eliminate least significant terms of the preparatory calibration polynomial;
   adding the most significant cross terms;
   selecting a number of terms of a polynomial;
   adding low degree cross terms
   choosing a maximum degree of the highest degree of an independent variable;
   preparing a plurality of terms of the preparatory calibration polynomial wherein each term of said plurality of terms includes a different one of said independent variables and a different degree of the independent variable;
   adding some trial cross terms.

2. A method of calibrating an instrument, comprising the steps of:
   forming a preparatory calibration polynomial including a primary independent variable and at least one interference related independent variable;
   obtaining a plurality of data sets of a dependent variable, the primary independent variable and the at least one interference related independent variable;
   using the data sets to eliminate least significant terms of the preparatory calibration polynomial;
   adding the most significant cross terms wherein the step of using the data sets to eliminate least significant terms of the preparatory calibration polynomial includes the steps of:
   eliminating one term at a time of the preparatory calibration polynomial, determining the coefficients of remaining terms;

determining the maximum deviation until the maximum deviation has been determined for several of the terms;

permanently eliminating the terms having the least effect on the maximum deviation.

3. A method of calibrating an instrument in accordance with claim 2 wherein a corrected calibration polynomial is obtained; and the corrected calibration polynomial is used to obtain a calibrated signal from a measured signal.

4. A method in accordance with claim 3 wherein the corrected calibration polynomial is stored in a microcontroller.

5. A method in accordance with claim 4 wherein the instrument measures the rate of flow of a liquid.

6. A method in accordance with claim 4 wherein the instrument measures impurities in water.

7. A method in accordance with claim 4 wherein the instrument measures the depth of a liquid.

8. A method of calibrating an instrument, comprising the steps of:

forming a preparatory calibration polynomial including a primary independent variable and at least one interference related independent variable;

obtaining a plurality of data sets of a dependent variable, the primary independent variable and the at least one interference related independent variable;

using the data sets to eliminate least significant terms of the preparatory calibration polynomial;

adding the most significant cross terms one at a time;

calculating coefficients for the polynomial each time a cross term is added;

determining the maximum deviation; and permanently adding cross terms having the most beneficial effect on the maximum deviation.

\* \* \* \* \*